UNITED STATES PATENT OFFICE.

JOHN J. CROOKE, OF NEW YORK, N. Y.

MANUFACTURE OF TIN-FOIL.

SPECIFICATION forming part of Letters Patent No. 315,007, dated April 7, 1885.

Application filed August 8, 1884. (No specimens.)

*To all whom it may concern:*

Be it known that I, JOHN J. CROOKE, a citizen of the United States, residing in the city of New York, county of New York, and State of New York, have invented a new and useful Improvement in the Manufacture of Tin-Foil; and I declare that the following is a full, clear, and exact description and specification of the said improvement.

Tin-foil has been made by applying a sheet of pure tin to both sides of a sheet of lead and welding the whole together by passing the sheets so arranged between the rolls of an ordinary flatting-mill set to exert a certain pressure; but it is a fact that foils made by this method are imperfect, even when a large quantity of tin is used for the surface-covering. The difference in hardness and malleability between lead and tin causes the tin during lamination to be driven into the surface of the lead in deep longitudinal furrows, producing corresponding irregular parallel ridges, and as the foil in process of rolling becomes attenuated the tin covering the apex of these ridges invariably ruptures, thus exposing lead upon the surface and producing the condition technically known as "lead streaks." In order to remedy this defect, manufacturers have resorted to various devices, particularly to hardening of the lead core; but unfortunately if any other metal besides tin is used to harden the core, or an alloy in which tin must largely predominate, the lead becomes brittle; hence, to harden the core properly, would so greatly advance the cost of the foil as to render its general use impossible. It is owing to this fact that so-called "tin-foils" are daily placed upon the market bearing upon their surfaces streaks and blotches of oxidizable lead.

To remedy this defect was the object of the invention of the process and manufacture of what is known as the "compound tin-foil" described in Patent No. 195,490, granted to me September 25, 1877. That invention was based upon the discovery that the warmth produced in the act of rolling would cause a hard alloy of lead and tin to work practically like commercially pure tin. Taking advantage of this fact, my method of manufacture was to roll an ingot of alloy composed of lead and tin to the requisite thinness. Upon this I placed a sheet of pure tin, which was welded to the alloy by passing the same through the rolls under proper pressure. This compound sheet was milled down to about thirteen wire-gage. I then rolled an ingot of lead down to about three-eights of an inch in thickness. Upon this I doubled lengthwise the tin-plated alloy, and passed the stratified sheets (each retaining its proper position) through the mill, set to a pressure that would weld the sheets into one compound slab. This compound slab was then reduced by successive passages through the rolls to foil. By this process of manufacture I obtained a more even distribution of the tin upon the exposed face of the foil, the intercolated hard alloy of lead and tin preventing in a great measure any disturbance of the tin from a plane surface on the side in contact with the alloy. This method for the manufacture of compound foils I have practiced for a number of years, and although vastly superior to the old process, I have been long aware that it did not fully answer all the requirements of a perfect art.

The enormous amount of pressure required to weld thick pieces of stock by milling down has been heretofore a fatal impediment to the absolutely even surface distribution of the tin. Independent of the lead streaks on the surface of commercial foil it will be found, upon a partial denudation of the surface, that the tin in many places is a mere film, and in other places is from three to four times the necessary thickness to answer all the requirements of a perfect tin covering. To correct this uneven distribution of the tin, to secure a solid unbroken surface, and to produce a foil at a minimum cost that shall possess all the requisites of a pure tin-foil, is the object of my invention.

In order that my improvement may be fully understood, I will proceed to describe the various steps of the process.

The first step is to prepare the compound tin-plating. As an example for general purposes, I take an ingot of metal composed of lead slightly hardened with tin. (One hundred pounds of lead to one-half pound of tin are the proportions I prefer in making the alloy.) I cast this ingot of the following dimensions: eighteen inches long, seven-eighths of an inch thick, and of any width required. I then place upon this slab of alloy a sheet of tin that will entirely cover its surface upon one side only. This sheet of tin has been rolled to about thirty-five gage, and is consequently quite thin. I then pass the slab carrying the sheet of tin upon its upper surface through the rolls, welding the tin to the alloy by the pressure of one passage. The ingot will now be about two feet in length. I then place another sheet of tin of the same gage of a size sufficient to cover the surface of the tin which has previously been welded to the slab. I then weld this sheet of tin by passing the slab through the rolls upon the sheet of tin already welded to the alloy. This process of building up sheet upon sheet I continue until I have placed a sufficient amount of tin upon one side of the sheet of alloy that will insure a solid unbroken surface of pure tin when the stock is rolled down in connection with a lead core to thin foil. When I have thus placed in laminæ a sufficient number of sheets of pure tin, I roll this laminated sheet down to about fourteen gage and divide it into two equal parts. Each part will be about eight and one-half feet long. I then take two slabs of lead eighteen inches long, seven-eighths of an inch thick, and of the same width as the tin-plated alloy. I roll each of these lead ingots by successive passages through the rolls to a length of about four feet. I then place one of these slabs of lead lengthwise between one of the sheets of tin-plated alloy, which has been doubled for that purpose by bringing its two ends together, thereby covering the lead upon both sides, and at the open end allowing the tin-plated alloy to project about three inches beyond the lead slab. I then weld the whole together by one passage of the sheets so arranged through the rolls. After the tin-plated covering has been welded to the lead core it is, by successive passages through the rolls, gradually milled down to foil.

In practice I find, that when the tin-plating is applied to the alloyed slab in the condition of thin sheets, the welding pressure required is very much less, and in building up the plating by the successive addition of such thin sheets an absolutely even distribution of the tin upon the surface of the underlying base metal is thereby obtained. In the manufacture of tin-plated foils it is of the greatest importance that the surface of such foils should carry a perfect covering of pure tin. With my new method of plating for the manufacture of foil I find that a certain weight of tin will produce a solid unbroken surface of pure tin, while the old method of plating with the same amount of tin welded at one operation will produce a broken, leaden-streaked and oxidizable surface. This regular and irregular distribution of the tin, as illustrated by the two methods, is caused by the difference in pressure required to weld a thin or a thick sheet to the thick slab of base metal; or, in other words, a longitudinal axial line will stand nearer to the upper and under nipping surfaces of the rolls, thus bringing the lines of motion and power near enough to equalize the molecular movement of the metals.

In rolling a thick or a thin slab of metal there is a noticeable difference between the two in the movement and arrangement of their particles, especially in their lateral arrangement and movement. This difference is caused by the greater or lesser distance maintained between their exterior or rolling contact surfaces and their interior or contact surfaces by transmission. Hence the thinner the slab the more controllable are the results for which the power is applied. In the present case examination will show that the tin welded to the alloy has maintained an absolutely plane and smooth surface at the point of welding-contact.

In practice I find that however small the quantity of tin taken, the plating with my process will be found absolutely even, and if the proper amount of tin is applied, (which need not be as much as is now used in the manufacture of my compound foil,) the result will be a foil carrying a solid pure-tin surface possessing all the sanitary qualities of a foil composed throughout of entirely pure tin.

The built-up plating or covering of tin sheets may be applied to one surface only of the lead base or core, thus producing an article suitable for some uses.

What is claimed is—

1. In manufacturing tin-foil, the process of forming the plating or covering strip, the same consisting in welding many sheets or laminæ of tin to an alloy base by successive applications and rolling, substantially as described.

2. The improved process of manufacturing tin-foil, the same consisting in first forming a plating or covering strip by applying sheet after sheet of tin to a slab of alloy and welding each sheet by rolling, and thereafter uniting said laminated plating or covering strip to a base or core of lead by rolling, substantially as described.

In testimony whereof I have hereunto set my hand in the presence of two subscribing witnesses.

JOHN J. CROOKE.

In presence of—
H. T. MUNSON,
T. H. PALMER.